Dec. 14, 1965 F. A. NACHMAN, JR Re. 25,951

MULTIPLE COIL SPRING ASSEMBLY

Original Filed Dec. 1, 1960

INVENTOR.
Fred A. Nachman, Jr.
BY
Ooms, McDougall, Williams & Hersh
Att'ys

United States Patent Office

Re. 25,951
Reissued Dec. 14, 1965

25,951

MULTIPLE COIL SPRING ASSEMBLY

Fred A. Nachman, Jr., Chicago, Ill., assignor to Nachman Corporation, Chicago, Ill., a corporation of Illinois Original No. 3,079,615, dated Mar. 5, 1963, Ser. No. 73,094, Dec. 1, 1960. Application for reissue May 28, 1964, Ser. No. 381,605
7 Claims. (Cl. 5—246)

Matter enclosed in heavy brackets [ ] appears in the original patent but forms no part of this reissue specification; matter printed in italics indicates the additions made by reissue.

This invention relates to a spring assembly for use in bedding such as bedsprings or inner spring mattresses, and relates more particularly to a new and improved coil spring assembly having improved resiliency and feel in position of use.

It is an object of this invention to produce a coil spring assembly for use in bedding such as bedsprings or inner-spring mattresses, and it is a related object to produce a spring assembly of the type described which is characterized by improved stiffness and resiliency in the edge construction and improved softness and resiliency in the body portion thereof, while embodying means substantially to maintain the spring assembly in a flattened arrangement for improved appearance and operation in position of use.

These and other objects and advantages of this invention will hereinafter appear, and for purposes of illustration, but not of limitation, an embodiment of the invention is shown in the accompanying drawing, in which—

Figure 1:
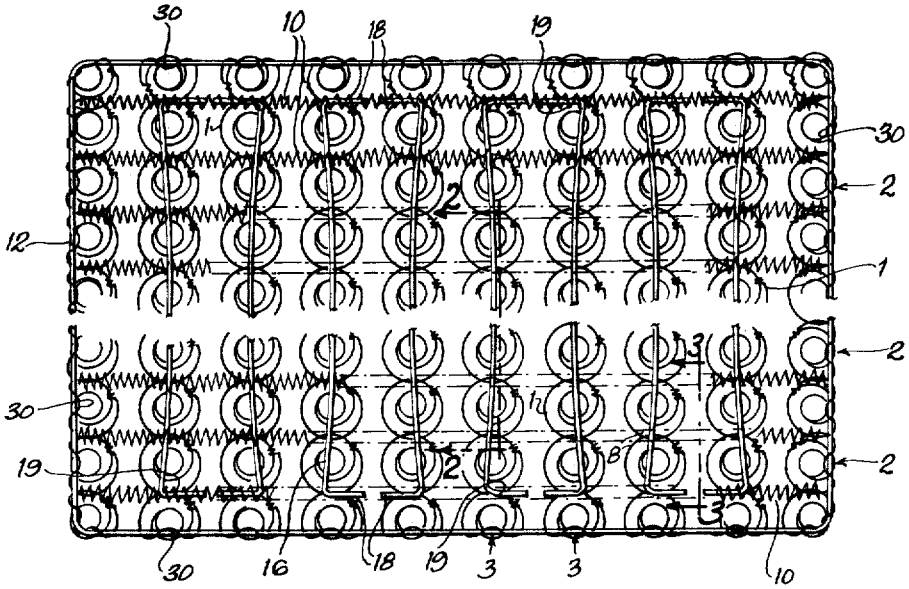
FIG. 1 is a top plan view of a spring assembly embodying the features of this invention.

With reference to these drawings, it is seen that the spring assembly comprises a series of saddle-shaped coil springs 1 arranged in parallelly spaced-apart rows 2 in the horizontal direction and 3 in the vertical direction, as viewed in FIG. 1. The springs 1 are disposed in adjacent relationship within a given row, such as the rows 3, and preferably such that the outer extremities of their respective terminal coils 8 slightly overlap. Means, such as the helical tie wires 10 extending transversely of the rows 3 and encircling and enjoining the springs of the several rows, are provided to interconnect the adjacently disposed coil springs in a row with each other and with the corresponding adjacently disposed coil springs of the next adjacent parallelly spaced-apart rows. A top border frame member 12 and a correspondingly disposed bottom border frame member 14 (not shown) are arranged about the assembled coil springs adjacent the top and the bottom terminal coils respectively of the outermost coil springs of the rows 2 and 3.

Figure 4:
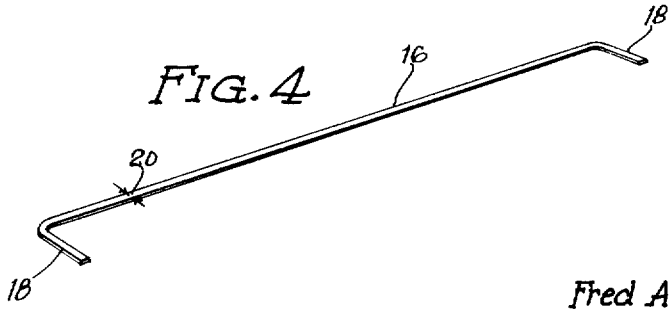
FIG. 4 is a perspective view of one of the bridging bands.

Elongate resilient bands 16 are provided to bridge all but the outermost one or two of the coil springs of each row 3. The bands 16 are equipped with terminal flanges (such as the L-shaped angled extension pieces 18) which are disposed in overlapping surface contact with the inner extremities 19 of the terminal coils 8 of the outermost one or two coil springs of the rows 3. The widths 20 of the bridging bands 16 are dimensioned to be less than the length between the coils of the helical tie wires 10 so that the bridging bands 16 may pass between these coils. The bridging bands 16 may be of any suitable configuration but preferably are formed from resilient flat stock, of spring metal, wire, plastics or wood, such as is shown in FIG. 4.

Figure 2:
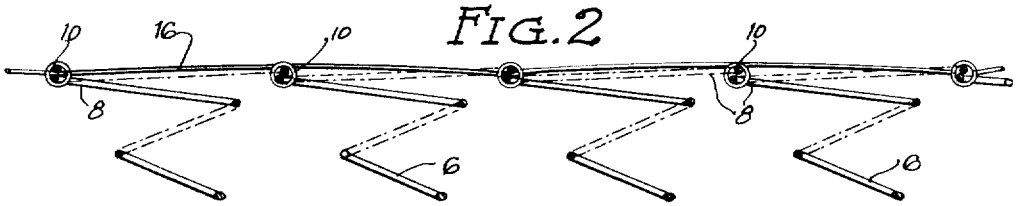
FIG. 2 is a sectional view taken substantially along the line 2—2 of FIG. 1.
Figure 3:
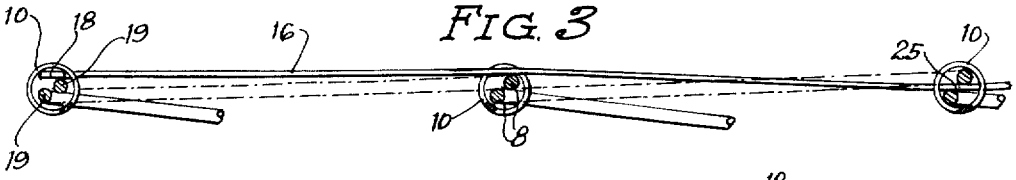
FIG. 3 is a fragmentary sectional view taken substantially along the line 3—3 of FIG. 1.

The bands 16 may be bridged across the rows 3 in any of several fashions. Thus, they may pass over, under, or between the terminal coils 8. However, the preferred arrangement is for the bands 16 to interweave across the rows as by first passing over [(as shown by the numeral 24 in FIG. 3)] and then between (such as shown by the numeral 25 in FIG. 3) the adjacent terminal coils in sequence, as most clearly seen in FIG. 2. The bridging bands 16 are secured by the helical tie wires 10 so as to interconnect the terminal coil portions of the coil springs and thereby to join all the springs of a given row. It should be noted that the helical tie wires 10 which interconnect the outermost coil springs of the rows 3 likewise encompass and interconnect the terminal flanges 18 of the resilient bands 16.

The boarder frame members 12 and 14 may be formed of any suitable rigid, resilient material such as of plastics, wood or the like, but it is preferred to form the border frame members as spring metal members of heavier cross-section than the wires forming the coils of the coil springs. While the border frame members are preferably formed with a rectangular cross-section, elements of round or of other shape may be employed.

In accordance with the practice of this invention, an improved assembled relation for the border frame members and the assembled coils is achieved by turning the outermost portion of the terminal coil about the boarder frame members for direct engagement therewith. By virtue of this practice, an assembly having markedly improved characteristics relative to the strength, rigidity and resilience of its edge portion is achieved. For this purpose, the border frame members are positioned to extend inwardly as chord members across the terminal coils of the springs a substantial distance from the outer edges of the terminal coils of the outermost coil springs so that, prior to assembly, the border frame members 12 and 14 overlie a substantial portion of the terminal coils 8 of the coil springs to locate the border frame members substantially in vertical alignment with all of the coils of the coil springs including the intermediate spring coils 6 of lesser dimension making up the remainder of the coil spring 1 where a saddle-type coil is used. This brings the border frame members more directly in operative alignment with the principal lines of force existing through the coil springs.

The portion of the spring coils overlapped by the border wire is sufficient for wrapping about the border frame member, as illustrated at 30, more completely to tie-in the border frame members with the coil springs and into alignment with the concentration of coils of the coil springs, as distinguished from being offset therefrom. This provides for greater resistance, stiffness and resiliency in the edge construction of the spring assembly, thereby to provide the effect heretofore secured only by the objectionable use of auxiliary spring elements to form the border portions.

It should be noted that, when the spring assembly is constructed according to the above description, the bridging bands 16 form an integral brace which links all the springs of a row 3 and yet which is not directly connected to the border frame members. By such a construction, the spring assembly is characterized by a flat body portion, the resiliency of which is essentially independent of the resiliency of the border frame members. Thus, a unit may be farbricated having a sturdy and rigid edge construction without sacrifice of any desired degree of softness, resiliency and flatness in the central portion thereof.

It should be understood that various changes and modifications may be made in the details of construction, arrangement, operation, and materials for the various elements without departing from the spirit and the scope of the invention, especially as defined in the appended claims.

I claim:

1. A multiple coil spring assembly comprising a plurality of coil springs arranged in parallel spaced apart lengthwise and crosswise rows, means for interconnecting adjacent coil springs in one row one with the other and with adjacent coil springs of adjacent parallel spaced apart rows, a top border frame member and a bottom border frame member positioned about the assembled coil springs adjacent the top and bottom coil springs respectively of the outermost coil springs in the rows, and continuous, unidirectional flat bands of resilient material bridging the intermediate springs of each lengthwise row, said bands having terminal flanges overlapping and disposed in surface contact with the inner extermities of the terminal coils of the coil springs outwardly of the ends of the bands thereby joining the springs of the several rows, said border frame members being positioned to extend as a chord across the terminal coils of the outermost coil springs to subdivide the terminal coils into an outwardly extending portion and an inwardly extending portion, the former of which are wrapped about the border frame member to effect an interconnection therebetween whereby the border frame member is positioned in substantially vertical alignment with the central portion of the springs and in substantial vertical alignment with the major axial forces capable of being developed by the engaged coil springs.

2. A multiple coil spring assembly comprising a plurality of coil springs arranged in parallel spaced apart lengthwise and crosswise rows, means interconnecting adjacent coil springs in one row with each other and with the adjacent coil springs of the adjacent parallel spaced apart rows, a top border frame members and a bottom border frame member ararnged about the assembled coil springs adjacent the top and bottom terminal coils respectively of the outermost coil springs in the rows, a continuous, unidirectional flat band of resilient material bridging all but the outermost coil springs of each lengthwise row, each band having terminal flanges overlapping and disposed in surface contact with the inner portions of the terminal coils of the outermost coil springs thereby to join the coil springs of the several rows, said border frame members being positioned to extend as a chord across the terminal coils of the outermost coil springs to subdivide the terminal coils into an inwardly extending portion and an outwardly extending portion, the latter of which is wrapped about the adjacent portion of the border frame member to effect an interconnection therebetween while positioning the border frame member in vertical alignment with the major axial forces of the coil springs.

3. A multiple coil spring assembly comprising a plurality of coil springs arranged in parallel spaced apart lengthwise and crosswise rows, means interconnecting adjacent coil springs in one row with each other and with the adjacent coil springs of the adjacent parallel spaced apart rows comprising helical tie wires extending transversely of said rows and encircling the adjoining portions of the terminal coils of the adjacent coil springs of the rows, a top border frame member and a bottom border frame member arranged about the assembled coil springs adjacent the top and bottom terminal coils respectively of the outermost coil springs in the rows, and continuous, unidirectional flat bands of resilient material bridging the intermediate coil springs in each lengthwise row and having terminal flanges overlapping and disposed in surface contact with the inner portion of the coil springs immediately outwardly of the ends of the bridging bands and which is interconnected with the terminal coils of the coil springs by the helical tie wires encircling same, said border frame members being positioned to extend as a chord across the terminal coils of the outermost coil springs to subdivide the terminal coils into an inwardly extending portion and an outwardly extending portion, the latter of which is wrapped inwardly about the adjacent portion of the border frame member to effect an interconnection therebetween which positions the border frame members in substantial vertical alignment with the major concentration of coils in the coil springs thereby to position the border frame members in substantial vertical alignment with the major axial forces capable of being developed by the engaged coil springs.

4. A multiple coil spring assembly as claimed in claim 3 in which the coil springs are of saddle shape.

5. A multiple coil spring assembly as claimed in claim 4 in which the border frame members are positioned to be vertically aligned with the outermost portion of the coil of smallest dimension in the saddle-shaped coil springs.

6. A multiple coil spring assembly as claimed in claim 3 in which the bridging bands bridge all but the outermost coil springs of each row and in which the terminal flanges comprise end portions turned substantially perpendicularly from the body portion of the bridging bands.

*7. A multiple coil spring assembly comprising a plurality of coil springs arranged in parallel spaced apart lengthwise and crosswise rows, means for interconnecting adjacent coil springs in one row one with the other and with adjacent coil springs of adjacent parallel spaced apart rows, a top border frame member and a bottom border frame member positioned about the assembled coil springs adjacent the top and bottom coil springs respectively of the outermost coil springs in the rows, and continuous, unidirectional flat bands of resilient material bridging the intermediate springs of each lengthwise row, said bands having terminal flanges overlapping and disposed in surface contact with the inner extremities of the terminal coils of the coil springs outwardly of the ends of the bands thereby joining the springs of the several rows, and means interconnecting the border frame members and the adjacent terminal coils of the outermost coil springs in the rows.*

References Cited by the Examiner

The following references, cited by the Examiner, are of record in the patented file of this patent or the original patent.

UNITED STATES PATENTS

| | | | |
|---|---|---|---|
| 2,012,575 | 8/1935 | McInerney | 5—351 X |
| 2,383,157 | 8/1945 | Pink | 5—248 |
| 2,473,706 | 6/1949 | Gleason | 5—260 X |
| 2,589,053 | 3/1952 | Clark | 5—252 X |
| 2,885,693 | 5/1959 | Wuest | 5—260 |

FOREIGN PATENTS

| | | |
|---|---|---|
| 333,130 | 11/1958 | Switzerland. |

FRANK B. SHERRY, *Primary Examiner.*

R. D. KRAUS, *Assistant Examiner.*